United States Patent
Higuma et al.

(10) Patent No.: US 11,833,973 B2
(45) Date of Patent: Dec. 5, 2023

(54) VEHICLE DISPLAY DEVICE, VEHICLE DISPLAY METHOD, AND NON-TRANSITORY COMPUTER-READABLE MEDIUM STORING VEHICLE DISPLAY PROGRAM

(71) Applicant: TOYOTA JIDOSHA KABUSHIKI KAISHA, Toyota (JP)

(72) Inventors: Tomohito Higuma, Toyota (JP); Yosuke Kubota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/837,511

(22) Filed: Jun. 10, 2022

(65) Prior Publication Data

US 2023/0038913 A1    Feb. 9, 2023

(30) Foreign Application Priority Data

Aug. 4, 2021    (JP) .................................. 2021-128449

(51) Int. Cl.
  *B60R 1/22*    (2022.01)
  *B60R 11/04*   (2006.01)
  *B60K 35/00*   (2006.01)
  *B60R 11/00*   (2006.01)

(52) U.S. Cl.
  CPC ................ *B60R 1/22* (2022.01); *B60K 35/00* (2013.01); *B60R 11/04* (2013.01); *B60K 2370/176* (2019.05); *B60K 2370/188* (2019.05); *B60R 2011/004* (2013.01); *B60R 2300/105* (2013.01); *B60R 2300/303* (2013.01); *B60R 2300/607* (2013.01)

(58) Field of Classification Search
  None
  See application file for complete search history.

(56) References Cited

U.S. PATENT DOCUMENTS

| 2011/0063444 A1* | 3/2011 | Okamoto | G06V 20/58 |
| | | | 348/148 |
| 2019/0174060 A1* | 6/2019 | Oba | H04N 7/188 |

FOREIGN PATENT DOCUMENTS

| JP | 2010-166196 A | 7/2010 |
| JP | 2019-110454 A | 7/2019 |

* cited by examiner

*Primary Examiner* — Rebecca A Volentine
(74) *Attorney, Agent, or Firm* — Oblon, McClelland, Maier & Neustadt, L.L.P.

(57) ABSTRACT

A control section generates an overhead surround view composite image by combining image data acquired by plural cameras, and, combines the image data to generate a wide-range rear image, a left rear image, a right rear image, a front image and a rear image. The control section calculates angles of view of the image data that were used in generating the wide-range rear image, the left rear image, the right rear image, the front image and the rear image, respectively. The control section displays any of the wide-range rear image, the left rear image, the right rear image, the front image and the rear image in a first display region, and displays information expressing angles of view corresponding to images displayed in the first display region in a second display region in a manner of being superimposed on the overhead surround view composite image.

9 Claims, 6 Drawing Sheets

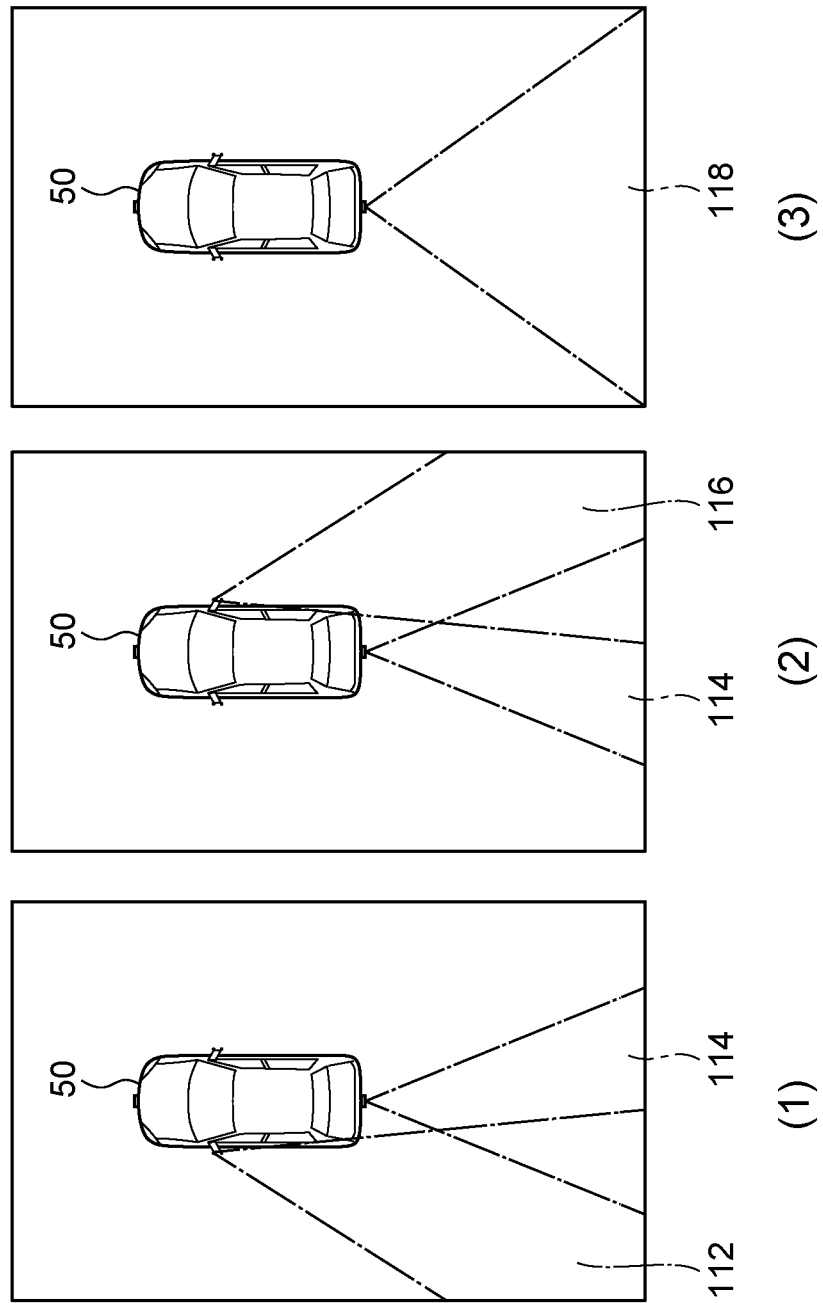

VEHICLE DISPLAY DEVICE, VEHICLE DISPLAY METHOD, AND NON-TRANSITORY COMPUTER-READABLE MEDIUM STORING VEHICLE DISPLAY PROGRAM

CROSS-REFERENCE TO RELATED APPLICATION

This application claims priority under 35 USC 119 from Japanese Patent Application No. 2021-128449, filed on Aug. 4, 2021, the disclosure of which is incorporated by reference herein.

BACKGROUND

Technical Field

The present disclosure relates to a vehicle display device, a vehicle display method, and a non-transitory computer-readable medium storing a vehicle display program.

Related Art

A vehicle display device is known that converts viewpoints in image data, which are acquired by plural cameras provided at the front, the rear, the left and the right of a vehicle respectively, into viewpoints of viewing downward from a virtual camera position that is set at a central upper position of the vehicle, and generates and displays an overhead surround view composite image by combining front, rear, left and right overhead images or the like. This vehicle display device can display, as monitor images, regions that are blind spots for an occupant of the vehicle, and can provide effective driving assistance information to the vehicle occupant during parking or the like.

Japanese Patent Application Laid-Open (JP-A) No. 2010-166196 discloses an invention in which, when a composite image is generated, the occurrence of duplicate projection at the seams between the images used in combining is suppressed, and, in addition to an overhead surround view composite image, images of the front side, the rear side, the right side, the rear side, and far off from the associated vehicle (own vehicle) are displayed on a vehicle display device.

In the technique disclosed in above-described JP-A No 2010-166196, when a user views a displayed image, it is difficult for the user to distinguish in which direction that displayed image is being viewed from the associated vehicle.

SUMMARY

The present disclosure provides a vehicle display device that may easily distinguish in which direction a displayed image is being viewed from the associated vehicle (own vehicle).

A first aspect of the present disclosure is a vehicle display device including: a plurality of image capturing sections acquiring respective image data of a front side, of a left lateral side, of a right lateral side and of a rear side of an associated vehicle; an image combining section that, after converting the image data acquired by the plurality of image capturing sections into viewpoints of viewing downward from a virtual camera position set at a central upper position of the associated vehicle, combines the image data so as to generate an overhead surround view composite image in which an entire periphery of the associated vehicle is seen in an overhead view, and generates: a wide-range rear image by combining the image data of the left lateral side, the image data of the rear side and the image data of the right lateral side, a left rear image by combining the image data of the left lateral side and the image data of the rear side, a right rear image by combining the image data of the rear side and the image data of the right lateral side, a front image by trimming the image data of the front side of the associated vehicle, and a rear image by trimming the image data of the rear side of the associated vehicle; an angle of view extracting section that calculates angles of view of the wide-range rear image, the left rear image, the right rear image, the front image and the rear image in the image data that were used in generating the wide-range rear image, the left rear image, the right rear image, the front image and the rear image respectively; and a display control section controlling an in-vehicle display section such that any of the wide-range rear image, the left rear image, the right rear image, the front image and the rear image are displayed in a first display region of the in-vehicle display section, and such that information expressing angles of view corresponding to images displayed in the first display region is displayed in a second display region of the in-vehicle display section in a manner of being superimposed on the overhead surround view composite image.

The vehicle display device of the first aspect of the present disclosure displays any of a wide-range rear image, a left rear image, a right rear image, a front image and a rear image in a first display region of an in-vehicle display section, and displays information expressing angles of view corresponding to images displayed in the first display region in a second display region of the in-vehicle display section in a manner of being superimposed on the overhead surround view composite image. Due thereto, the direction in which the displayed image is viewed from the associated vehicle may easily be distinguished.

In a second aspect of the present disclosure, the above-described first aspect may further include a switching portion that changes display of the first display region, wherein, on the basis of operation of the switching portion, the display control section may change the display of the first display region to the wide-range rear image, the left rear image, the right rear image, the front image, the rear image, and no display.

The vehicle display device of the second aspect of the present disclosure may change the displayed image by operation from a driver.

In a third aspect of the present disclosure, in the above-described first aspect, the display control section may displays either the left rear image or the right rear image in the first display region in accordance with operation of a turn signal of the associated vehicle, and may display a rear image in the first display region in a case in which a transmission of the associated vehicle is set to reverse.

The vehicle display device of the third aspect of the present disclosure may switch the displayed image in accordance with the traveling state of the vehicle.

In a fourth aspect of the present disclosure, in the above-described aspect, at a time of changing an image displayed in the second display region, the display control section may temporarily display, in an emphasized manner, information expressing an angle of view corresponding to the changed image on the overhead surround view composite image that is displayed in the second display region.

The vehicle display device of the fourth aspect may suggest to the driver that the image display has changed by displaying the image angle after the change in an emphasized manner.

In a fifth aspect of the present disclosure, in any of the above-described first through third aspects, at a time of changing an image displayed in the second display region, the display control section may display information expressing an angle of view corresponding to the changed image, for a predetermined time and in a manner of being superimposed on the overhead surround view composite image that is displayed in the second display region.

The vehicle display device of the fifth aspect of the present disclosure limits the display of the angle of view to only a predetermined time. Therefore, it may be possible to prevent a driver from feeling that the display of the angle of view is annoying.

In a sixth aspect of the present disclosure, in the above-described aspect, the display control section may display respective angles of view, which are superimposed on the overhead surround view composite image, in respectively different colors, and may display regions, which correspond to the respective angles of view of the images displayed in the first display region, so as to be surrounded by lines of same colors as the angles of view superimposed on the overhead surround view composite image.

The vehicle display device of the sixth aspect of the present disclosure displays the respective angles of view in different colors in the second display region, and displays the regions, which correspond to the respective angles of view of the images displayed in the first display region, so as to be surrounded by lines of the same colors as the angles of view that are displayed in the second display region. Due thereto, it may be possible to suggest, to the driver, the relationships of correspondence between the images displayed in the first display region and the angles of view of the images acquired by the respective image capturing sections.

In a seventh aspect of the present disclosure, in the above-described aspect, the image combining section: may generate the wide range rear image, the left rear image and the right rear image respectively by combining predetermined regions that are centered on optical axes of the image capturing sections and that are extracted from the respective image data acquired by the image capturing sections, and in a case in which no pixels are detected at a boundary of an image obtained by combining, may enlarge the predetermined regions and combines the images again, and in a case in which an abnormality in pixel values indicating moiré is detected at a boundary of an image obtained by combining, may reduce the predetermined regions and combines the images again.

In a case in which there is a defect at a boundary of a combined image, the vehicle display device of the seventh aspect of the present disclosure may solve the defect by dynamically changing the predetermined regions of image data, which were used in combining, and combining the images again.

An eighth aspect of the present disclosure is a vehicle display method including: after converting image data acquired by a plurality of image capturing sections that acquire respective image data of a front side, of a left lateral side, of a right lateral side and of a rear side of an associated vehicle, into viewpoints of viewing downward from a virtual camera position set at a central upper position of the associated vehicle, combining the image data so as to generate an overhead surround view composite image in which an entire periphery of the associated vehicle is seen in an overhead view, and generating: a wide range rear image by combining the image data of the left lateral side, the image data of the rear side and the image data of the right lateral side, a left rear image by combining the image data of the left lateral side and the image data of the rear side, a right rear image by combining the image data of the rear side and the image data of the right lateral side, a front image by trimming the image data of the front side of the associated vehicle, and a rear image by trimming the image data of the rear side of the associated vehicle; calculating angles of view of the wide range rear image, the left rear image, the right rear image, the front image and the rear image in the image data that were used in generating the wide range rear image, the left rear image, the right rear image, the front image and the rear image respectively; and controlling an in-vehicle display such that any of the wide range rear image, the left rear image, the right rear image, the front image or the rear image are displayed in a first display region of the in-vehicle display, and such that information expressing angles of view corresponding to images displayed in the first display region is displayed in a second display region of the in-vehicle display in a manner of being superimposed on the overhead surround view composite image.

The vehicle display method of the eighth aspect of the present disclosure displays any of a wide-range rear image, a left rear image, a right rear image, a front image and a rear image in a first display region of an in-vehicle display section, and displays information expressing angles of view corresponding to images displayed in the first display region in a second display region of the in-vehicle display section in a manner of being superimposed on the overhead surround view composite image. Due thereto, the direction in which the displayed image is viewed from the associated vehicle may easily be distinguished.

A ninth aspect of the present disclosure is a non-transitory computer-readable medium on which is recorded a vehicle display program executable by a computer to function as: an image combining section that, after converting image data acquired by a plurality of image capturing sections that acquire respective image data of a front side, of a left lateral side, of a right lateral side and of a rear side of an associated vehicle, into viewpoints of viewing downward from a virtual camera position set at a central upper position of the associated vehicle, combining the image data so as to generate an overhead surround view composite image in which an entire periphery of the associated vehicle is seen in an overhead view, and that generates: a wide range rear image by combining the image data of the left lateral side, the image data of the rear side and the image data of the right lateral side, a left rear image by combining the image data of the left lateral side and the image data of the rear side, a right rear image by combining the image data of the rear side and the image data of the right lateral side, a front image by trimming the image data of the front side of the associated vehicle, and a rear image by trimming the image data of the rear side of the associated vehicle; an angle of view extracting section that calculates angles of view of the wide range rear image, the left rear image, the right rear image, the front image and the rear image in the image data that were used in generating the wide range rear image, the left rear image, the right rear image, the front image and the rear image respectively; and a display control section controlling an in-vehicle display section such that any of the wide range rear image, the left rear image, the right rear image, the front image or the rear image are displayed in a first display region of the in-vehicle display section, and such that information expressing angles of view corresponding to images displayed in the first display region is displayed in a second display region of the in-vehicle display section in a manner of being superimposed on the overhead surround view composite image.

The vehicle display program of the ninth aspect of the present disclosure displays any of a wide-range rear image, a left rear image, a right rear image, a front image and a rear image in a first display region of an in-vehicle display section, and displays information expressing angles of view corresponding to images displayed in the first display region in a second display region of the in-vehicle display section in a manner of being superimposed on the overhead surround view composite image. Due thereto, the direction in which the displayed image is viewed from the associated vehicle may easily be distinguished.

BRIEF DESCRIPTION OF THE DRAWINGS

Exemplary embodiments will be described in detail based on the following figures, wherein:

FIG. 6 is an explanatory drawing illustrating (1) camera angles of view of a left rear image, (2) camera angles of view of a right rear image, and (3) a camera angle of view of a rear image, respectively.

DETAILED DESCRIPTION

Figure 1:
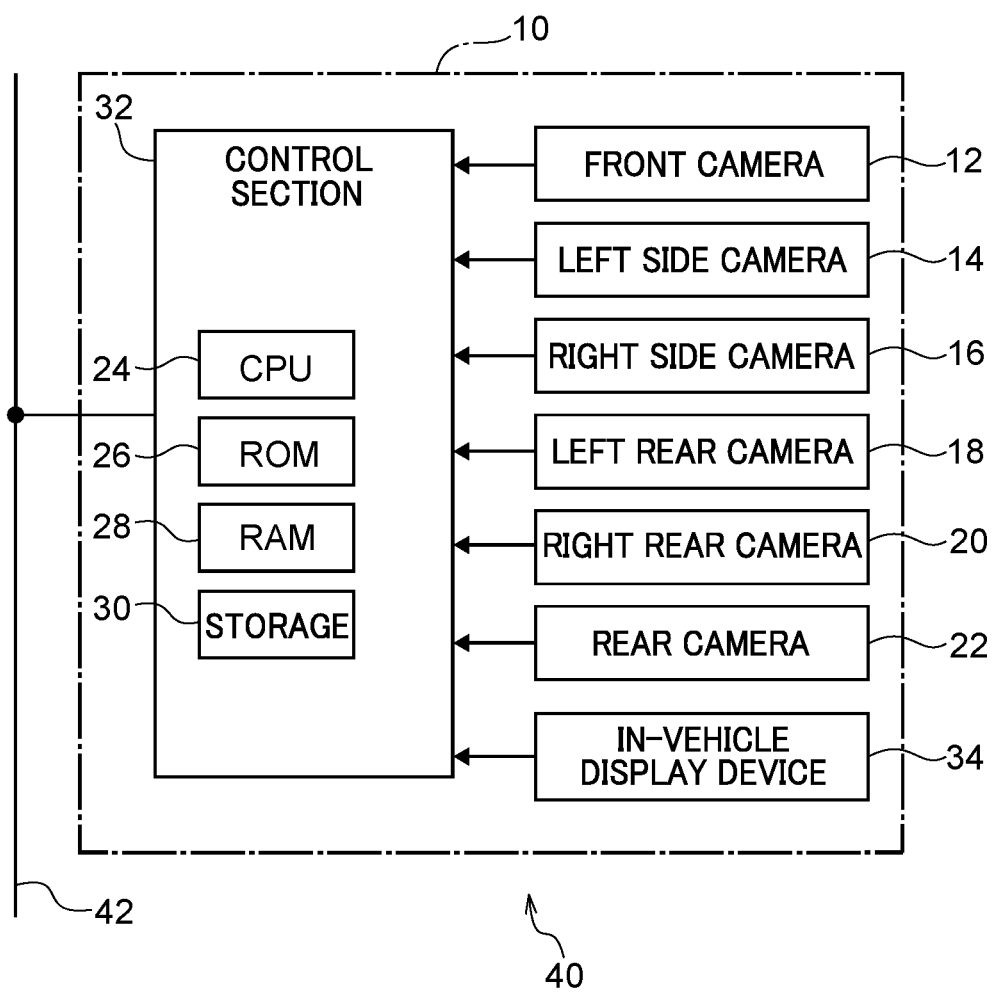
FIG. 1 is a block drawing illustrating the configuration of a vehicle display device in a present exemplary embodiment.

A vehicle display device 10 of a present exemplary embodiment is described hereinafter with reference to FIG. 1 through FIG. 3. An onboard system 40 illustrated in FIG. 1 includes a bus 42. Plural electronic control units, which carry out respectively different controls, and plural sensor units are respectively connected to the bus 42. Note that FIG. 1 illustrates only the portion of the onboard system 40 that relates to the present exemplary embodiment. Each electronic control unit is a control unit that includes a CPU, a memory and a non-volatile storage, and is hereafter called an ECU (Electronic Control Unit). A control section 32 of the vehicle display device 10 is included among the plural ECUs that are connected to the bus 42.

A front camera 12, a left side camera 14, a right side camera 16, a left rear camera 18, a right rear camera 20, a rear camera 22 and an in-cabin display device 34 are connected to the control section 32. The control section 32, the front camera 12, the left side camera 14, the right side camera 16, the left rear camera 18, the right rear camera 20, the rear camera 22 and the in-cabin display device 34 configuration the vehicle display device 10.

The front camera 12 is an image capturing device that acquires video images of the front side of the vehicle. The left side camera 14 is an image capturing device that acquires video images of the left side of the vehicle. The right side camera 16 is an image capturing device that acquires video images of the right side of the vehicle. The left rear camera 18 is an image capturing device that acquires video images of an obliquely left rear side of the vehicle. The right rear camera 20 is an image capturing device that acquires video images of an obliquely right rear side of the vehicle. The rear camera 22 is an image capturing device that acquires video images of the rear side of the vehicle.

Figure 2:
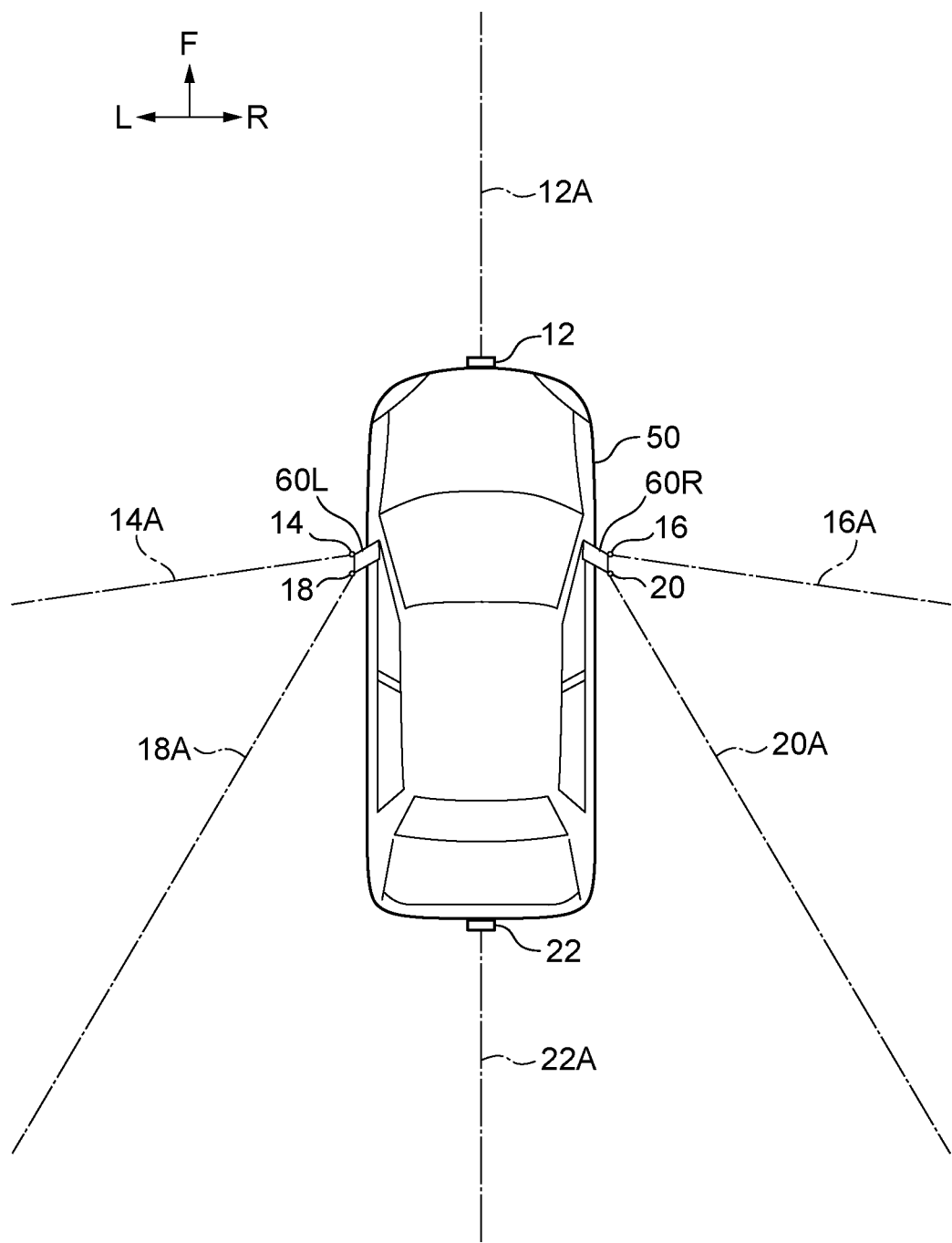
FIG. 2 is a schematic drawing illustrating the placement, in an associated vehicle, of and the optical axes of a front camera, a left side camera, a right side camera, a left rear camera, a right rear camera, and a rear camera, respectively.

FIG. 2 is a schematic drawing illustrating the placement, within an associated vehicle (own vehicle), and respective optical axes 12A, 14A, 16A, 18A, 20A, 22A, of the front camera 12, the left side camera 14, the right side camera 16, the left rear camera 18, the right rear camera 20 and the rear camera 22. Each of the front camera 12, the left side camera 14, the right side camera 16, the left rear camera 18, the right rear camera 20 and the rear camera 22 is a diagonal fish-eye lens having an angle of view of approximately 180°. In a case in which the resolutions of the left side camera 14 and the right side camera 16 are high, the left rear camera 18 and the right rear camera 20 do not have to be provided.

As illustrated in FIG. 2, the front camera 12 is provided at a front end portion of the associated vehicle 50, and has the optical axis 12A that is parallel to the longitudinal direction of the associated vehicle 50, and acquires images of the front side of the associated vehicle 50. The position at which the front camera 12 is disposed may be any position at which images of the front side of the associated vehicle 50 can be captured. The front camera 12 may be disposed at the front end portion of the associated vehicle 50 (e.g., in a vicinity of the front bumper), or may be disposed so as to capture images of the front side of the associated vehicle 50 through the front windshield glass.

The left side camera 14 is provided at the left end of a left door mirror (a left camera support in a vehicle that is equipped with electronic mirrors) 60L, and has the optical axis 14A that extends slightly rearward of the left side of the associated vehicle 50, and acquires images of the left side of the associated vehicle 50.

The right side camera 16 is provided at the right end of a right door mirror (a right camera support in a vehicle that is equipped with electronic mirrors) 60R, and has the optical axis 16A that extends slightly rearward of the right side of the associated vehicle 50, and acquires images of the right side of the associated vehicle 50.

The left rear camera 18 is provided at the left end of the left door mirror 60L and further toward the rear than the left side camera 14, and has the optical axis 18A that extends toward the rear of the left side of the associated vehicle 50, and acquires images of the left rear side of the associated vehicle 50.

The right rear camera 20 is provided at the right end of the right door mirror 60R and further toward the rear than the right side camera 16, and has the optical axis 20A that extends toward the rear of the right side of the associated vehicle 50, and acquires images of the right rear side of the associated vehicle 50.

The rear camera 22 is provided at a rear end portion of the associated vehicle 50, and has the optical axis 22A that is parallel to the longitudinal direction of the associated vehicle and acquires images of the rear side of the associated vehicle 50. Provided that the rear camera 22 can capture images of the rear side of the associated vehicle 50, the rear camera 22 may be disposed at a rear end portion of the associated vehicle 50 (e.g., in a vicinity of the rear bumper), or may be disposed so as to capture images of the rear side of the associated vehicle 50 through the rear windshield glass.

The in-cabin display device 34 is a display device having a first display region, which displays image data acquired by at least one of the left rear camera 18, the right rear camera 20 and the rear camera 22, or images generated by combining these image data, and a second display region which is provided at the dashboard or the like of the associated vehicle and displays an overhead surround view composite image that is generated by combining image data acquired by the front camera 12, the left side camera 14, the right side camera 16 and the rear camera 22. The in-cabin display device 34 employs any of a liquid crystal panel, a plasma display, a cathode ray tube, or the like. The images that are displayed on the in-cabin display device 34 can be switched by operation of a switch provided at the steering or the like of the associated vehicle 50.

As illustrated in FIG. 1, the control section 32 includes a CPU (Central Processing Unit) 24, a ROM (Read Only Memory) 26, a RAM (Random Access Memory) 28 and a storage 30.

The CPU 24 is a central computing processing unit that executes various programs and controls various sections. The CPU 24 reads-out a program from the ROM 26 or the storage 30, and executes the program by using the RAM 28 as a workspace.

Figure 3:
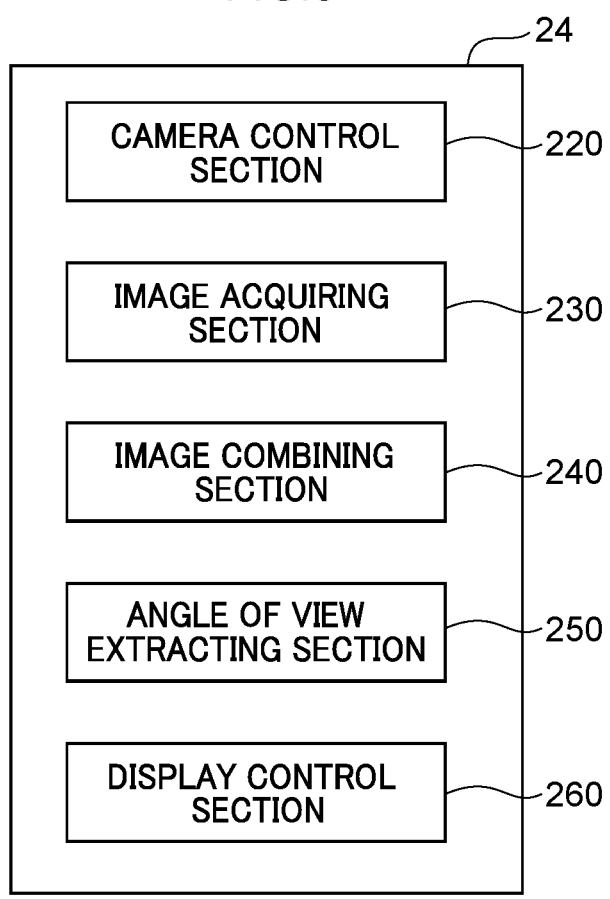
FIG. 3 is a block drawing illustrating functional configurations of a CPU of a control section.

FIG. 3 is a block drawing illustrating functional configurations of the CPU 24 of the control section 32. As illustrated in FIG. 3, the CPU 24 includes a camera control section 220, an image acquiring section 230, an image combining section 240, an angle of view extracting section 250 and a display control section 260. These respective functional configurations are realized by an execution program that is stored in the ROM 26 or the storage 30 being read-out and being executed.

The camera control section 220 controls the aperture values, shutter speeds and focuses of the front camera 12, the left side camera 14, the right side camera 16, the left rear camera 18, the right rear camera 20 and the rear camera 22, respectively.

The image acquiring section 230 acquires data of video images from each of the front camera 12, the left side camera 14, the right side camera 16, the left rear camera 18, the right rear camera 20 and the rear camera 22, and outputs the acquired data to the image combining section 240 that is a post-processing stage.

The image combining section 240 combines the image data acquired by the front camera 12, the left side camera 14, the right side camera 16 and the rear camera 22 respectively so as to generate an overhead surround view composite image, and generates an image, in which image data acquired by the left rear camera 18, the right rear camera 20 and the rear camera 22 respectively are combined, as an image that is displayed on the in-cabin display device 34 separately from the overhead surround view composite image. The images, which are generated from the image data acquired by the left rear camera 18, the right rear camera 20 and the rear camera 22 respectively, are, for example, a wide-range rear image that combines the three images acquired by the left rear camera 18, the right rear camera 20 and the rear camera 22 respectively, and a left rear image that combines the image data acquired by the left rear camera 18 and the rear camera 22 respectively, and a right rear image that combines the image data acquired by the right rear camera 20 and the rear camera 22 respectively. Moreover, the image combining section 240 trims the image data acquired by the front camera 12 so as to generate a front image of the associated vehicle 50, and trims the image data acquired by the rear camera 22 so as to generate a rear image of the associated vehicle 50. The image combining section 240 then outputs the processed image data to the angle of view extracting section 250.

The angle of view extracting section 250 extracts an angle of view of the time when an image of at least one of the left rear camera 18, the right rear camera 20 and the rear camera 22 is displayed on the in-cabin display device 34 separately from the overhead surround view composite image. As described above, each of the front camera 12, the left side camera 14, the right side camera 16, the left rear camera 18, the right rear camera 20 and the rear camera 22 has an angle of view of approximately 180°. Therefore, in the present exemplary embodiment, the image data acquired by the front camera 12, the left rear camera 18 (or the left side camera 14), the right rear camera 20 (or the right side camera 16) and the rear camera 22 respectively are trimmed to angles of view that are narrower than 180°, and are combined by the image combining section 240 as needed. As an example, the angle of view extracting section 250 calculates the angle of view of the image data acquired by each camera from the surface area ratio (the ratio of the number of pixels) of the region, which relates to the image data acquired by each camera in the image formed by the combining by the image combining section 240, and the original image, and outputs the information of the calculated angle of view to the display control section 260 that is a post-processing stage.

The display control section 260 displays the wide-range rear image, the left rear image, the right rear image, the front image and the rear image that were generated by the image combining section 240, and controls the in-cabin display device 34 such that the angles of view relating to the respective image capturing devices that were calculated by the angle of view extracting section 250, are displayed so as to be superimposed on the overhead surround view composite image. Moreover, the display control section 260 changes the image that is displayed on the in-cabin display device 34 in accordance with the operation of a switch, the operation of a turn signal, and the operation of the transmission.

Figure 4:
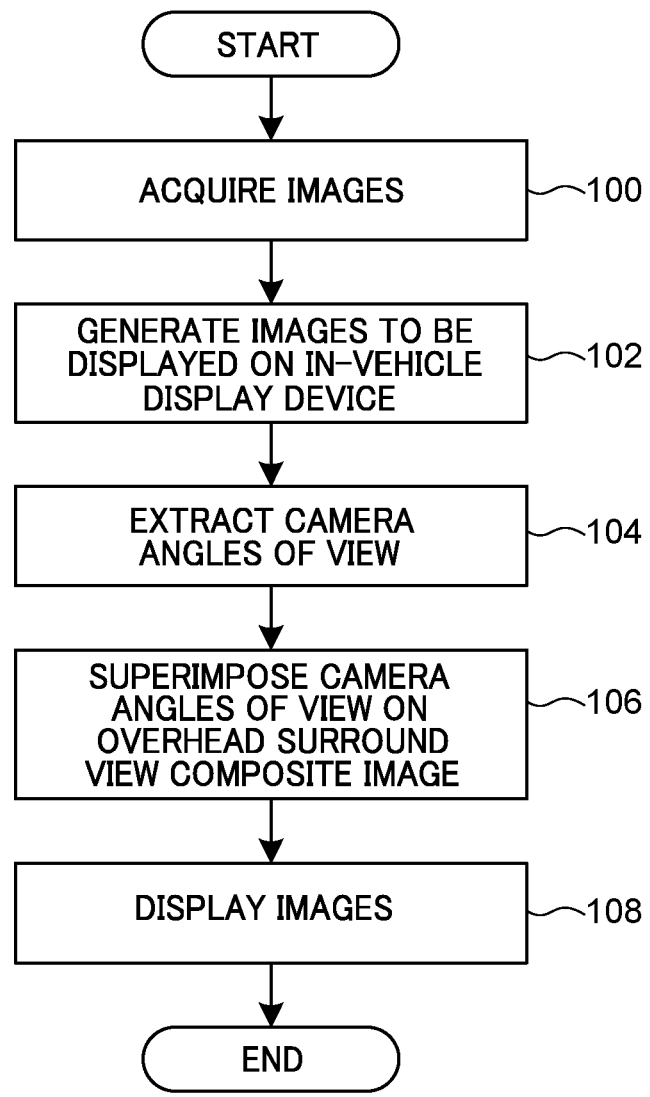
FIG. 4 is a flowchart illustrating processings at the control section of the vehicle display device relating to the present exemplary embodiment.

FIG. 4 is a flowchart illustrating an example of processing at the control section 32 of the vehicle display device 10 relating to the present exemplary embodiment. In step 100, image data from the front camera 12, the left side camera 14, the right side camera 16, the left rear camera 18, the right rear camera 20 and the rear camera 22 respectively are acquired.

In step 102, an overhead surround view composite image, a wide-range rear image, a left rear image, a right rear image, a front image and a rear image that are to be displayed on the in-cabin display device 34 are generated from the respective, acquired image data of the front camera 12, the left side camera 14, the right side camera 16, the left rear camera 18, the right rear camera 20 and the rear camera 22. As described above, each of the front camera 12, the left side camera 14, the right side camera 16, the left rear camera 18, the right rear camera 20 and the rear camera 22 is a diagonal fish-eye lens having an angle of view of approximately 180°, and therefore, almost all of the objects in front of the lens are imaged subjects. In the present exemplary embodiment, an optimal region of image data obtained by capturing a wide-range is extracted, and the overhead surround view composite image, the wide-range rear image, the left rear image, the right rear image, the front image and the rear image are generated.

Figure 5:
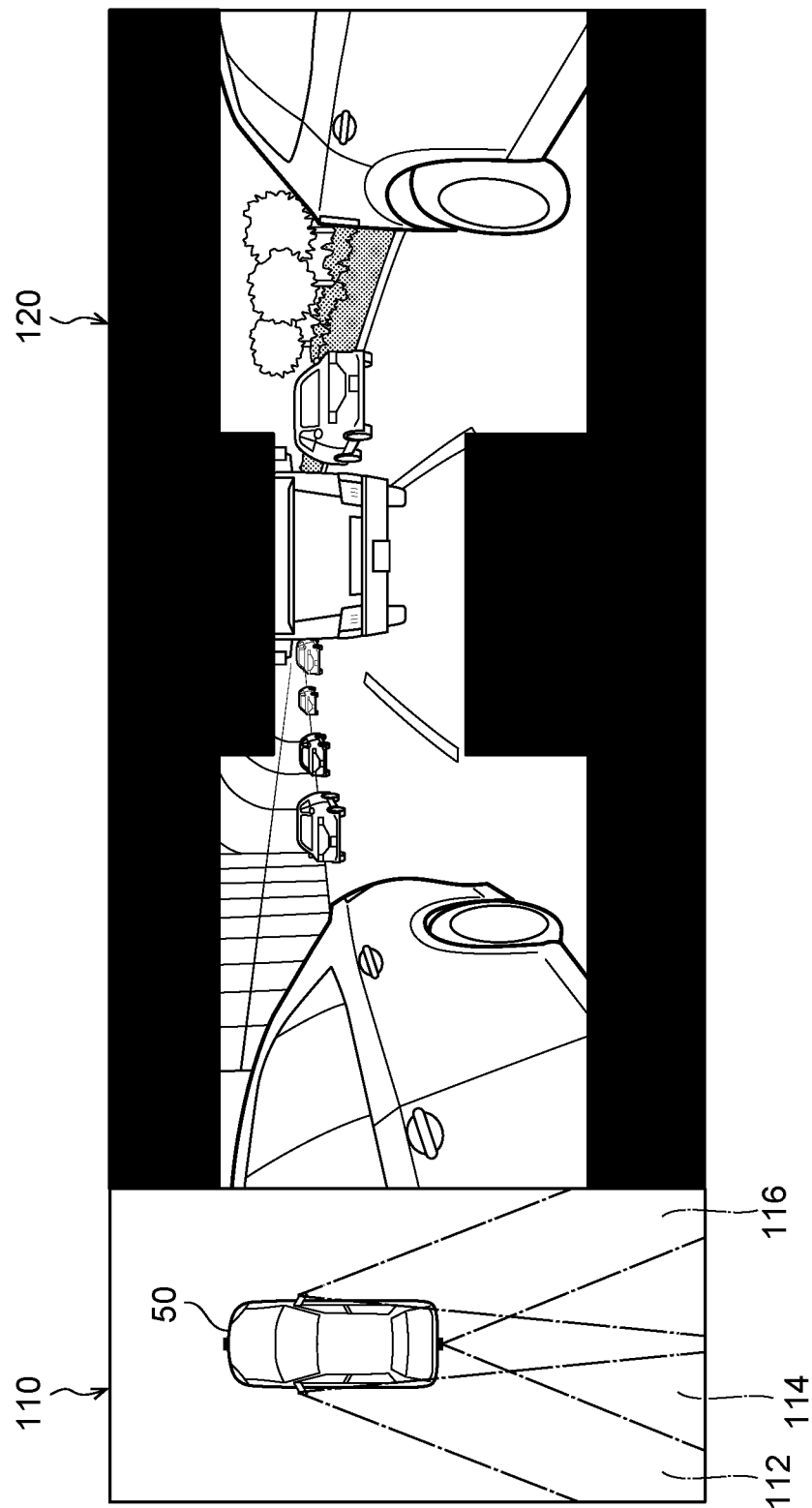
FIG. 5 is a schematic drawing illustrating an overhead surround view composite image and a wide-range rear image that are displayed on an in-cabin display device.

FIG. 5 is a schematic drawing illustrating an example of an overhead surround view composite image 110 and a wide-range rear image 120 that are displayed on the in-cabin display device 34. The overhead surround view composite image 110 is generated by converting the viewpoints in the image data acquired by the front camera 12, the left side camera 14, the right side camera 16 and the rear camera 22 respectively to viewpoints of viewing downward from a virtual camera position set at a central upper position of the associated vehicle 50, and combining the images.

The wide-range rear image 120 is generated by extracting predetermined regions, which are centered on the optical axes 18A, 20A, 22A of the respective cameras, from the image data acquired by the left rear camera 18, the right rear camera 20 and the rear camera 22 respectively, and combining the image data of the extracted regions. As an example, predetermined regions in the image data acquired by the respective cameras are set such that the image data acquired by the left rear camera 18 and the image data acquired by the rear camera 22 are superimposed, and the image data acquired by the rear camera 22 and the image data acquired by the right rear camera 20 are superimposed. The regions in which the image data are superimposed on one other may have a required minimum size that is of an extent such that voids of pixels do not arise in the combined image. With regard to the image data from which the predetermined regions are extracted, for example, subjects are detected by contour extraction processing such as edge enhancement or the like, and positioning for combining the respective image data is carried out such that same subjects in the respective image data are superimposed on one another, and the respective image data are combined.

The left rear image is generated by extracting predetermined regions that are centered on the optical axes 18A, 22A of the respective cameras from image data acquired by the left rear camera 18 and the rear camera 22 respectively, and combining the image data of the extracted regions. The right rear image is generated by extracting predetermined regions that are centered on the optical axes 20A, 22A of the respective cameras from image data acquired by the right rear camera 20 and the rear camera 22 respectively, and combining the image data of the extracted regions. The predetermined regions in the left rear image and the right rear image respectively also are set such that the image data acquired by the respective cameras are superimposed, and positioning for combining the respective image data is carried out such that same subjects in regions, in which the image data are superimposed on one another, are superimposed on one another, and the respective image data are combined.

Although the left rear camera 18 and the right rear camera 20 are not required in cases in which the resolutions of the left side camera 14 and the right side camera 16 are high or the like, in such cases, a left rear image is generated from the image data acquired by the left side camera 14 and the image data acquired by the rear camera 22, and a right rear image is generated from the image data acquired by the right side camera 16 and the image data acquired by the rear camera 22, respectively.

Even in cases in which positioning for combining image data with one another is carried out and the image data are combined, there is the concern that duplicate projection of a subject, disappearance of a subject, or the like may occur at the boundary of the combined image. In the present exemplary embodiment, by dynamically changing the ranges of the predetermined regions corresponding to the angles of view during the combining of the images, duplicate projection of a subject, disappearance of a subject, and the like at the boundary of the combined image is eliminated. For example, in a case in which pixels are not detected at the boundary of the combined image, it is determined that a subject has disappeared, and the predetermined region of each image is enlarged, and the respective images are combined again. Moreover, in a case in which abnormalities in pixel values indicating moiré or the like are detected at a boundary of the combined image, it is determined that there is duplicate projection, and the predetermined region of each image is reduced, and the respective images are combined again.

In step 104, the camera angles of view at the time of generating the wide-range rear image, the left rear image, the right rear image, the front image and the rear image respectively are extracted. As an example, the camera angles of view are left rear camera angle of view 112, rear camera angle of view 114, and right rear camera angle of view 116 that are illustrated in the overhead surround view composite image 110 of FIG. 5. Each camera angle of view indicates the image capturing direction and the image capturing range that are centered on the optical axis of the image capturing device. Therefore, it is possible to easily distinguish in which direction the displayed image is being viewed from the associated vehicle 50. The camera angles of view may be the angles of the ranges that are centered on the optical axes 18A, 20A, 22A of the cameras corresponding to the predetermined regions described above, or the respective camera angles of view may be derived from the sizes of the regions of the image data relating to the respective cameras in the wide-range rear image, the rear image, the right rear image, the front image and the rear image obtained by the combining of the images.

The camera angles of view in the left rear image are as illustrated in (1) of FIG. 6, and the camera angles of view in the right rear image are as illustrated in (2) of FIG. 6. Each of the left rear camera angle of view 112, the rear camera angle of view 114, and the right rear camera angle of view 116 in the left rear image and the right rear image are the same as in the overhead surround view composite image 110 illustrated in FIG. 5.

(3) of FIG. 6 is a rear camera angle of view 118 in a case in which, instead of a wide-range rear image 120, only the image acquired by the rear camera 22 is displayed on the in-cabin display device 34. As illustrated in (3) of FIG. 6, by making the rear camera angle of view 118 be larger than the camera angle of view in the wide-range rear image 120 or the like, an image of a wide-range at the rear of the associated vehicle 50 can be displayed on the in-cabin display device 34 without requiring image combining processing. As with the rear camera angle of view 114 and the rear camera angle of view 118, the angles of view of the respective cameras are not fixed to fixed values, and may be dynamically changed depending on the situation.

In step 106, the ranges of the camera angles of view are superimposed on the overhead surround view composite image 110. As described above, the left rear camera angle of view 112, the rear camera angle of view 114 and the right rear camera angle of view 116 are illustrated in the overhead surround view composite image 110 illustrated in FIG. 5. By superimposing the ranges of the camera angles of view on the overhead surround view composite image 110 in this way, it is possible to intuitively grasp in which direction, from a position centered on the associated vehicle 50, the image that is displayed on the in-cabin display device 34 was captured. Moreover, as illustrated in FIG. 5, by displaying the left rear camera angle of view 112, the rear camera angle of view 114, and the right rear camera angle of view 116 respectively in a superimposed manner on the overhead surround view composite image 110, the position, with respect to the associated vehicle 50, of the vehicle that is at the end of the wide-range rear image 120 can be suggested to the driver that is the user. The camera angles of view that are displayed in a manner of being superimposed on the overhead surround view composite image 110, which are illustrated by the one-dot chain lines in FIG. 5, may be displayed in colors that are easy to see such as red, yellow, blue, green or the like, or the regions that are surrounded by the one-dot chain lines may be displayed in colors that are different from other regions. Further, the camera angles of view of the respective cameras may be displayed in different colors in the second display region, and the regions, which correspond to the respective camera angles of view in the image displayed in the first display region, may be displayed so as to be surrounded by lines of the same color as that of the corresponding camera angle of view.

In step 108, the overhead surround view composite image 110, the wide-range rear image 120, the left rear image, the right rear image, the front image or the rear image, on which the camera angles of view are superimposed, are displayed on the in-cabin display device 34, and the processing is ended. Due to the driver operating a switch provided at the steering wheel or the like of the associated vehicle 50, the display of the in-cabin display device 34 can be selected from the wide-range rear image 120, the left rear image based on the camera angles of view illustrated in (1) of FIG. 6, the right rear image based on the camera angles of view illustrated in (2) of FIG. 6, the rear image based on the camera angle of view illustrated in (3) of FIG. 6, the front image, and image display being turned off. For example, the switch provided at the steering wheel or the like may be a type of a toggle switch, and switching to the wide-range rear image 120, the left rear image, the right rear image, the rear image, the front image, and image display off may be carried out each time the switch is operated.

The display on the in-cabin display device 34 may be changed not only by switch operation, but also in accordance with the travelling state of the associated vehicle 50. For example, in a case in which the associated vehicle 50 makes a left turn, a left rear image based on the camera angles of view illustrated in (1) of FIG. 6 is displayed. In a case in which the associated vehicle 50 makes a right turn, a right rear image based on the camera angles of view illustrated in (2) of FIG. 6 is displayed. In a case in which the associated vehicle 50 is backing up, a rear image based on the camera angle of view illustrated in (3) of FIG. 6 is displayed. More specifically, the left rear image or the right rear image is displayed in accordance with the operation of the turn signal, and the rear image is displayed in a case in which the transmission is set to reverse.

Whether to automatically change the displayed image in accordance with the traveling state of the associated vehicle 50, or to change the displayed image by a switch operation of the driver, is selected by operating a switch provided at the steering wheel, the dashboard or the like of the associated vehicle 50.

Further, the displayed image may usually be switched in accordance with the traveling state of the associated vehicle 50, and, in a case in which the driver operates the switch for image switching that is provided at the steering wheel or the like, an image based on the switch operation may be displayed for a predetermined time (about several seconds).

When the image that is displayed on the in-cabin display device 34 is switched, the suggestion that the camera angle of view has been switched is given to the driver by emphasized display such as causing the display of the camera angles of view superimposed on the overhead surround view composite image 110 to flash temporarily (for several seconds), or changing the display of the camera angles of view to a prominent color such as red or the like temporarily (for several seconds).

The camera angles of view may always be displayed so as to be superimposed on the overhead surround view composite image 110. However, in a case in which the image is switched by a switch operation of the driver, or in a case in which the image is switched in accordance with the traveling state, the camera angles of view may be displayed so as to be superimposed on the overhead surround view composite image 110 for a predetermined time (on the order of several seconds) only.

As described above, in accordance with the present exemplary embodiment, by displaying the camera angles of view relating to the wide-range rear image 120 and the like so as to be superimposed on the overhead surround view composite image 110, the vehicle display device 10, which enables easy discrimination of in which direction a displayed image is being viewed from the associated vehicle, may be obtained.

The driver can also grasp the positional relationship between the associated vehicle and the vehicles at the periphery of the associated vehicle 50 on the basis of the camera angles of view that are displayed in a superimposed manner on the overhead surround view composite image 110. This may contribute to safe driving.

Further, at the time of generating the overhead surround view composite image 110, the wide-range rear image 120 and the like by image combining, in a case in which there is the concern that duplicate projection of a subject, disappearance of a subject or the like will occur at the boundary of the combined image, duplicate projection of a subject, disappearance of a subject and the like at the boundary of the combined image can be overcome by, at the time of combining the images, dynamically changing the ranges of the predetermined regions corresponding to the angles of view.

Note that any of various types of processors other than a CPU may execute the processing that is executed due to the CPU reading-out software (a program) in the above-described exemplary embodiment. Examples of processors in this case include PLDs (Programmable Logic Devices) whose circuit configuration can be changed after production such as FPGAs (Field-Programmable Gate Arrays) and the like, and dedicated electrical circuits that are processors having circuit configurations that are designed for the sole purpose of executing specific processings such as ASICs (Application Specific Integrated Circuits) and the like, and the like. Further, the processing may be executed by one of these various types of processors, or may be executed by a combination of two or more of the same type or different types of processors (e.g., plural FPGAs, or a combination of a CPU and an FPGA, or the like). Further, the hardware configurations of these various types of processors are, more specifically, electrical circuits that combine circuit elements such as semiconductor elements and the like.

The above exemplary embodiment describes a form in which the program is stored in advance (installed) in the storage 30 or the like, but the present disclosure is not limited to this. The program may be provided in a form of being stored on a non-transitory storage medium such as a CD-ROM (Compact Disc Read Only Memory), a DVD-ROM (Digital Versatile Disc Read Only Memory), a USB (Universal Serial Bus) memory, or the like. Further, the program may be provided in a form that is downloaded from an external device over a network.

(Supplementary Note 1)

A vehicle display device includes:

a memory; and a processor coupled to the memory, the processor being configured to:

acquire respective image data of a front side, of a left lateral side, of a right lateral side and of a rear side of an associated vehicle;

after converting the acquired image data into viewpoints of viewing downward from a virtual camera position set at a central upper position of the associated vehicle, combine the image data so as to generate an overhead surround view composite image in which an entire periphery of the associated vehicle is seen in an overhead view, and generate a wide-range rear image by combining the image data of the left lateral side, the image data of the rear side and the image data of the right lateral side, a left rear image by combining the image data of the left lateral side and the image data of the rear side, a right rear image by combining the image data of the rear side and the image data of the right lateral side, a front image by trimming the image data of the front side of the associated vehicle, and a rear image by trimming the image data of the rear side of the associated vehicle;

calculate angles of view of the wide-range rear image, the left rear image, the right rear image, the front image and the rear image in the image data that were used in generating the wide-range rear image, the left rear image, the right rear image, the front image and the rear image respectively; and control an in-vehicle display section such that any of the wide-range rear image, the left rear image, the right rear image, the front image or the rear image are displayed in a first display region of the in-vehicle display section, and such that information expressing angles of view corresponding to images displayed in the first display region is displayed in a second display region of the in-vehicle display section in a manner of being superimposed on the overhead surround view composite image.

What is claimed is:

1. A vehicle display device comprising:

a memory; and a processor coupled to a plurality of cameras and to the memory, the processor being configured to:

acquire respective image data of a front side, of a left lateral side, of a right lateral side and of a rear side of an associated vehicle from the plurality of cameras;

after converting the image data into viewpoints of viewing downward from a virtual camera position set at a central upper position of the associated vehicle, combine the image data so as to generate an overhead surround view composite image in which an entire periphery of the associated vehicle is seen in an overhead view;

generate a wide-range rear image by combining the image data of the left lateral side, the image data of the rear side and the image data of the right lateral side, a left rear image by combining the image data of the left lateral side and the image data of the rear side, a right rear image by combining the image data of the rear side and the image data of the right lateral side, a front image by trimming the image data of the front side of the associated vehicle, and a rear image by trimming the image data of the rear side of the associated vehicle;

calculate angles of view of the wide-range rear image, the left rear image, the right rear image, the front image and the rear image in the image data that were used in generating the wide-range rear image, the left rear image, the right rear image, the front image and the rear image respectively; and control an in-vehicle display such that any of the wide-range rear image, the left rear image, the right rear image, the front image or the rear image are displayed in a first display region of the in-vehicle display, and such that information expressing angles of view corresponding to images displayed in the first display region is displayed in a second display region of the in-vehicle display in a manner of being superimposed on the overhead surround view composite image.

2. The vehicle display device of claim 1, wherein the processor is configured to change the display of the first display region to the wide-range rear image, the left rear image, the right rear image, the front image, the rear image, and no display, on the basis of an operation from a user.

3. The vehicle display device of claim 1, wherein the processor is configured to:

display either the left rear image or the right rear image in the first display region in accordance with operation of a turn signal of the associated vehicle, and display a rear image in the first display region in a case in which a transmission of the associated vehicle is set to reverse.

4. The vehicle display device of claim 1, wherein the processor is configured to, at a time of changing an image displayed in the second display region, temporarily display, in an emphasized manner, information expressing an angle of view corresponding to the changed image on the overhead surround view composite image that is displayed in the second display region.

5. The vehicle display device of claim 1, wherein the processor is configured to, at a time of changing an image displayed in the second display region, display information expressing an angle of view corresponding to the changed image, for a predetermined time and in a manner of being superimposed on the overhead surround view composite image that is displayed in the second display region.

6. The vehicle display device of claim 1, wherein the processor is configured to:

display respective angles of view, which are superimposed on the overhead surround view composite image, in respectively different colors, and display regions, which correspond to the respective angles of view of the images displayed in the first display region, to be surrounded by lines of same colors as the angles of view superimposed on the overhead surround view composite image.

7. The vehicle display device of claim 1, wherein the processor is configured to generate the wide-range rear image, the left rear image and the right rear image respectively by combining predetermined regions that are centered on optical axes of the cameras and that are extracted from the respective image data, and in a case in which no pixels are detected at a boundary of an image obtained by combining, enlarge the predetermined regions and combine the images again, and in a case in which an abnormality in pixel values indicating moiré is detected at a boundary of an image obtained by combining, reduce the predetermined regions and combine the images again.

8. A vehicle display method comprising:

after converting image data acquired by a plurality of cameras that acquire respective image data of a front side, of a left lateral side, of a right lateral side and of a rear side of an associated vehicle, into viewpoints of viewing downward from a virtual camera position set at a central upper position of the associated vehicle, combining the image data so as to generate an overhead surround view composite image in which an entire periphery of the associated vehicle is seen in an overhead view;

generating
- a wide-range rear image by combining the image data of the left lateral side, the image data of the rear side and the image data of the right lateral side,
- a left rear image by combining the image data of the left lateral side and the image data of the rear side,
- a right rear image by combining the image data of the rear side and the image data of the right lateral side,
- a front image by trimming the image data of the front side of the associated vehicle, and
- a rear image by trimming the image data of the rear side of the associated vehicle;

calculating angles of view of the wide-range rear image, the left rear image, the right rear image, the front image and the rear image in the image data that were used in generating the wide-range rear image, the left rear image, the right rear image, the front image and the rear image respectively; and controlling an in-vehicle display such that any of the wide-range rear image, the left rear image, the right rear image, the front image or the rear image are displayed in a first display region of the in-vehicle display, and such that information expressing angles of view corresponding to images displayed in the first display region is displayed in a second display region of the in-vehicle display in a manner of being superimposed on the overhead surround view composite image.

9. A non-transitory computer-readable medium on which is recorded a vehicle display program executable by a computer to perform processing comprising:

after converting image data acquired by a plurality of cameras that acquire respective image data of a front side, of a left lateral side, of a right lateral side and of a rear side of an associated vehicle, into viewpoints of viewing downward from a virtual camera position set at a central upper position of the associated vehicle, combining the image data so as to generate an overhead surround view composite image in which an entire periphery of the associated vehicle is seen in an overhead view;

generating
- a wide-range rear image by combining the image data of the left lateral side, the image data of the rear side and the image data of the right lateral side,
- a left rear image by combining the image data of the left lateral side and the image data of the rear side,
- a right rear image by combining the image data of the rear side and the image data of the right lateral side,
- a front image by trimming the image data of the front side of the associated vehicle, and
- a rear image by trimming the image data of the rear side of the associated vehicle;

calculating angles of view of the wide-range rear image, the left rear image, the right rear image, the front image and the rear image in the image data that were used in generating the wide-range rear image, the left rear image, the right rear image, the front image and the rear image respectively; and controlling an in-vehicle display such that any of the wide-range rear image, the left rear image, the right rear image, the front image or the rear image are displayed in a first display region of the in-vehicle display, and such that information expressing angles of view corresponding to images displayed in the first display region is displayed in a second display region of the in-vehicle display in a manner of being superimposed on the overhead surround view composite image.

* * * * *